US012327318B2

(12) United States Patent
Yashinski et al.

(10) Patent No.: US 12,327,318 B2
(45) Date of Patent: Jun. 10, 2025

(54) LOGGED REALITY (LR) SCENE GENERATION

(71) Applicant: GameChanger Ltd, Tel-Aviv (IL)

(72) Inventors: Yaron Yashinski, Tel-Aviv (IL); Nimrod Harel, Ramat HaSharon (IL); Ilan Yashinski, Kiryat-Ono (IL)

(73) Assignee: GameChanger Ltd, Tel-Aviv (IL)

( * ) Notice: Subject to any disclaimer, the term of this patent is extended or adjusted under 35 U.S.C. 154(b) by 351 days.

(21) Appl. No.: 17/894,299

(22) Filed: Aug. 24, 2022

(65) Prior Publication Data

US 2024/0070998 A1 Feb. 29, 2024

(51) Int. Cl.
| | |
|---|---|
| *H04N 5/262* | (2006.01) |
| *G06T 13/80* | (2011.01) |
| *G06T 19/00* | (2011.01) |
| *H04N 5/14* | (2006.01) |

(52) U.S. Cl.
CPC ............ *G06T 19/006* (2013.01); *G06T 13/80* (2013.01); *H04N 5/144* (2013.01); *H04N 5/262* (2013.01)

(58) Field of Classification Search
CPC ....... G06T 19/006; G06T 13/80; H04N 5/144; H04N 5/262; H04N 5/265
See application file for complete search history.

(56) References Cited

U.S. PATENT DOCUMENTS

| | | | | |
|---|---|---|---|---|
| 10,089,550 | B1 * | 10/2018 | Otte | G06T 11/00 |
| 2002/0038257 | A1 * | 3/2002 | Joseph | G06Q 30/0641 |
| | | | | 705/26.81 |
| 2010/0017820 | A1 * | 1/2010 | Thevathasan | G11B 27/036 |
| | | | | 725/35 |
| 2010/0050082 | A1 * | 2/2010 | Katz | H04N 21/435 |
| | | | | 715/848 |
| 2010/0296571 | A1 * | 11/2010 | El-Saban | H04N 21/21805 |
| | | | | 375/E7.026 |
| 2015/0290552 | A1 * | 10/2015 | Owoc | A63F 3/0423 |
| | | | | 472/75 |
| 2019/0089996 | A1 * | 3/2019 | Surcouf | H04N 21/23424 |
| 2021/0110164 | A1 * | 4/2021 | Mehta | G06V 40/169 |
| 2021/0133458 | A1 * | 5/2021 | Tuxen | G06V 20/42 |

* cited by examiner

*Primary Examiner* — Jitesh Patel (57) ABSTRACT

A method of creating automatically a merged video stream combining live-action and animation, comprising (1) receiving a video stream comprising a plurality of frames depicting a live-action scene in which one or more persons participates in an activity, the video stream captured by one or more video cameras is associated with an annotated timecode associating a timestamp of one or more of the plurality of frames depicting one or more of a plurality of predefined events relating to the activity with a description of the predefined events, (2) selecting automatically one or more of a plurality of predefined animation elements according to one or more event attributes of the predefined events, (3) creating a merged video stream by merging the selected predefined animation elements into the one or more frames identified by their timestamps, and (4) outputting an editable digital record of the merged video stream.

20 Claims, 5 Drawing Sheets

LOGGED REALITY (LR) SCENE GENERATION

FIELD AND BACKGROUND OF THE INVENTION

The present invention, in some embodiments thereof, relates to merging video streams depicting live-action scenes with animation elements, and, more specifically, but not exclusively, to merging video streams depicting live-action scenes with animation elements based on on-scene events logged in an annotated timecode associated with the video stream.

Television (TV) shows, for example, game shows, reality shows, talent shows, sports events, and/or the like are highly popular and form a major segment of TV broadcasting.

Production of such shows may be highly complicated and costly since the stage settings, scenic design, special effects and/or the like are constantly evolving in their complexity, grandeur, scope and/or the like which require increased costs, effort, and/or time to create, deploy, maintain and/or operate.

SUMMARY OF THE INVENTION

It is an object of the present invention to provide, methods, systems and software program products for creating a Logged Reality (LR) scene combining live-action and animation by merging animation elements into a video stream depicting a live-action scene, where the animation elements are added post-recording the live-action scene and are selected based on events logged in the video stream.

According to a first aspect of the present invention there is provided a method of creating automatically a merged video stream combining live-action and animation, comprising using one or more processors for:
  Receiving a video stream comprising a plurality of frames depicting a live-action scene in which one or more persons participates in an activity. The video stream captured by one or more video cameras is associated with an annotated timecode associating a timestamp of one or more of the plurality of frames depicting one or more of a plurality of predefined events relating to the activity with a description of the one or more predefined events.
  Selecting automatically one or more of a plurality of predefined animation elements according to one or more event attributes of the one or more predefined events.
  Creating a merged video stream by merging the selected one or more predefined animation elements into the one or more frames identified by their timestamps.
  Outputting an editable digital record of the merged video stream.

According to a second aspect of the present invention there is provided a system for creating automatically a merged video stream combining live-action and animation, comprising one or more processors executing a code. The code comprising:
  Code instructions to receive a video stream comprising a plurality of frames depicting a live-action scene in which one or more persons participates in an activity. The video stream captured by one or more video cameras is associated with an annotated timecode associating a timestamp of one or more of the plurality of frames depicting one or more of a plurality of predefined events relating to the activity with a description of the one or more predefined events.
  Code instructions to select automatically one or more of a plurality of predefined animation elements according to one or more event attributes of the one or more predefined events.
  Code instructions to create a merged video stream by merging the selected one or more predefined animation elements into the one or more frames identified by their timestamps.
  Code instructions to output an editable digital record of the merged video stream.

According to a third aspect of the present invention there is provided a computer program product for creating automatically a merged video stream combining live-action and animation, comprising a non-transitory medium storing thereon computer program instructions which, when executed by one or more hardware processors, cause the one or more hardware processors to:
  Receive a video stream comprising a plurality of frames depicting a live-action scene in which one or more persons participates in an activity. The video stream captured by one or more video cameras is associated with an annotated timecode associating a timestamp of one or more of the plurality of frames depicting one or more of a plurality of predefined events relating to the activity with a description of the one or more predefined events.
  Select automatically one or more of a plurality of predefined animation elements according to one or more event attributes of the one or more predefined events.
  Create a merged video stream by merging the selected one or more predefined animation elements into the one or more frames identified by their timestamps.
  Output an editable digital record of the merged video stream.

In a further implementation form of the first, second and/or third aspects, the one or more predefined animation elements into the one or more frames comprises rendering the one or more predefined animation element with the one or more frames and saving the merged one or more frames in the editable digital record.

In a further implementation form of the first, second and/or third aspects, the one or more predefined animation elements are pre-rendered.

In a further implementation form of the first, second and/or third aspects, the one or more predefined animation elements merged into the video stream are generated at a different speed than live-action content depicted in the video stream.

In a further implementation form of the first, second and/or third aspects, the one or more predefined animation elements are merged into the one or more frames based on alignment with one or more real-world reference element deployed in the scene and depicted in the one or more frame.

In a further implementation form of the first, second and/or third aspects, the one or more predefined animation elements merged into the one or more frames are adjusted to fit one or more scene elements deployed in the scene and depicted in the one or more frames.

In an optional implementation form of the first, second and/or third aspects, the video stream is adjusted to remove one or more real-world features from one or more frames of the video stream.

In an optional implementation form of the first, second and/or third aspects, the video stream comprises a composite video stream constructed of a plurality of separate video streams captured by a plurality of video cameras depicting the scene from a plurality of view angles.

In a further implementation form of the first, second and/or third aspects, the digital record of the merged video stream is created according to one or more video editing software formats.

In a further implementation form of the first, second and/or third aspects, the one or more events comprise one or more actions performed by the one or more persons.

In a further implementation form of the first, second and/or third aspects, the one or more events comprise one or more interactions of the one or more persons with one or more other persons.

In a further implementation form of the first, second and/or third aspects, the one or more animation elements are members of a group consisting of: a computer generated element, an image, a video clip, and/or a picture.

In an optional implementation form of the first, second and/or third aspects, one or more pre-recorded audio effects are selected according to the one or more event attributes and merging automatically the one or more pre-recorded audio effects into the video stream in association with the one or more frames.

In a further implementation form of the first, second and/or third aspects, the annotated timecode is included in one or more separate records associating the description with the timestamp of the one or more frames.

In a further implementation form of the first, second and/or third aspects the annotated timecode is included in metadata associated with the video stream.

In a further implementation form of the first, second and/or third aspects, the description of each of the one or more predefined events is generated automatically based on content and/or context analysis of the respective frame.

In a further implementation form of the first, second and/or third aspects, the activity comprises a show produced in a studio.

In a further implementation form of the first, second and/or third aspects, the activity comprises a private show.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to merging video streams depicting live-action scenes with animation elements, and, more specifically, but not exclusively, to merging video streams depicting live-action scenes with animation elements based on on-scene events logged in an annotated timecode associated with the video stream.

According to some embodiments of the present invention, there are provided methods, systems and computer program products for creating merged video streams by merging animation elements into video streams depicting one or more live-action scenes in which one or more persons (and/or animals) may participate in one or more activities.

The activities may comprise broadcast shows produced in studios, for example, game shows, music and/or talent contests, sports events, reality shows, and/or the like which are recorded and produced for broadcasting and/or distribution via one or more media distribution channels, for example, television, internet, movies, and/or the like. However, the activities may comprise one or more private activities, for example, a home production simulating a game show for private use, for example, a family member birthday activity and/or gift, a company event, and/or the like.

In particular, the animation elements may be merged into the video stream off-line after the live-action video stream is captured rather than in real-time while recording (filming) the activities taking place on the scene.

The animation elements, for example, a computer generated element, a picture, a frame, another video stream and/or the like may be predefined. One or more of the animation elements may be pre-rendered, i.e., rendered in advanced and merged into the video stream as is. However, one or more of the animation elements may be rendered together with the video stream when merging it into the video stream. Moreover, when one or more of the animation elements merged into the video stream may be generated and/or rendered at different speed compared to the live-action content depicted in the video stream. This may facilitate one or more effects such as, for example, slow motion, fast motion, and/or the like.

are designated "animation elements" to indicate that the they are distinct and not part of the live-action scenes such that the animation elements do not exist on the scene and are thus invisible, and/or undetectable in the video stream depicting scene.

The animation elements may be added and merged into the live-action scene to create a combined virtual scene in which the animation elements complement, enhance, and/or enrich the live-action scene. The animation elements may therefore typically simulate and/or present elements, items, objects, and/or the like relating to scenic design and/or stage settings, for example, background design, lighting elements, special effects, pyrotechnics, texture elements, accessories, and/or the like designed and/or configured to virtually enrich the live-action scene when merged into the video stream.

For example, assuming a certain scene is staged in a studio for a TV show, for example, a game show, a reality show, a talent contest, and/or the like. In such case, the scene may comprise minimal stage and scenic design elements and items, which are mainly used to enable the activity including actions and/or interaction of participants in the TV show and optionally for setting a frame and/or infrastructure for later merger with animation elements. After recording one or more video streams depicting the scene and live-action content relating to the TV show participants, one or more animation elements, for example, scenic design elements and/or items, stage settings, background design, lighting elements, accessories, and/or the like may be merged into the video stream(s) thus creating a video stream depicting a virtual TV show scene which is highly enriched compared to the originally recorded live-action scene.

The predefined animation elements may be selected automatically according to events relating to the persons participating in the activity and depicted in the video frames, for example, an action performed by a person, interaction between persons, and/or the like. In order to facilitate this, in addition to the standard timecode associated marking a timestamp of each frame of the video stream, an annotated timecode may be created to log the events detected during the activity and associate each event with one or more of the frames depicting the respective event, specifically associate a description of each event with a timestamp of the frames depicting it.

The predefined animation elements may be thus selected according to event attributes derived from the description of the predefined events in the annotated timecode (log) and merged into frames of the video stream according to the timestamps associating each event with the frames depicting it. In other words, a respective predefined animation element selected according to the event attribute(s) of a respective event may be merged into one or more frames of the video stream which depict the respective event where the frames depicting the respective event may be determined according to their timestamp in the timecode which is correlated with the certain event in the annotated timecode (log).

Optionally, the video stream may be further adjusted to remove, conceal, and/or discard one or more real-world features, elements, items, objects, and/or the like which are present in the live-action scene and are thus depicted in one or more frames of the video stream. For example, one or more of the frames may be adjusted to remove one or more structural elements depicted in the frames. In another example, one or more of the frames may be adjusted to remove one or more studio equipment items depicted in the frames, for example, camera, microphone, recording gear, control panel, and/or the like.

Optionally, one or more pre-recorded audio effects may be selected automatically according to one or more event attributes of one or more of the events logged in the annotated timecode added and/or merged into the video stream in association with the frames depicting the logged events.

Optionally, the video stream may comprise a composite video stream constructed of multiple separate video streams captured by a plurality of video cameras depicting the live-action scene from a plurality of view angles (view points).

The merged video stream combining the video stream depicting live-action scenes with the merged animation elements may be then saved in one or more editable digital records, for example, a file according to one or more formats, protocols and conventions supported by video editing software programs, tools, suites, and/or the like which may optionally further edit and/or manipulate the merged video stream.

Automatically selecting and merging predefined animation elements into video stream depicting live-action production activities such as, for example, TV shows may present major benefits and advantages compared to existing methods and systems for producing live-action activities involving complex, elaborate, detailed, and/or dynamic scenic design and/or stage settings.

First, a very high quality, complex, dramatic, exciting, impressive and/or glamourous scene may be created using animation elements while significantly reducing production costs, effort, time, and/or complexity. This is because most of the scenic design and stage settings and thus the appearance of the scene is achieved via the animation elements which are merged into the video stream offline in a very simple, low-cost, time efficient process which requires very little knowledge and/or expertise. Most if not all currently existing methods and systems for producing live-action activities, for example, TV shows are based on creating a complete real scene comprising real scenic design and stage settings, for example, background design, texture elements, lighting elements, special effects, pyrotechnics, accessories, and/or the like. Creating, operating and/or deploying such real scenic design and stage settings may be highly costly and may require significant resources, for example, manual labor, time, and/or the like. Merging predefined animation elements into video stream depicting live-action production activities, on the other hand may be very cost-effective and time efficient since only a very minimal real-action scene may be created for filming and recording the live-action activity on scene thus reducing and/d potentially eliminating the need to place real scenic design and stage settings on-set, in the production scene.

Moreover, filming and recording the activity in real-time in a comprehensive and fully decorated stage in which the scene comprising real scenic design and stage settings are real may be prone to errors, failures, and/or flaws, technical and/or human, for example, camera failure, lighting element failure, unsynchronized special effect, misreading of a participant, and/or the like. In such cases it is possible that the activity and/or part thereof may need to be recorded again which may significantly increase production costs, time, and/or the like. In contrast, recording of the activity in a low-end, low-cost scene (studio) may significantly reduce potential risk and/or damage due to such errors, failures, and/or flaws which are significantly reduced and potentially eliminated. Moreover, since most of the scenic design and stage settings are virtual, i.e., animation elements added later on (off-line) into the video stream, it may be very simple, time efficient, and/or low-cost to apply even extensive adjustments and/or fine-tuning of the scenic design and stage settings.

Furthermore, since the predefined animation elements are merged into the video stream offline, i.e., after recording the activity, the scenic design and/or stage settings of the scene may be changed, adjusted, and/or adapted post production whereas such changes, and/or adaptations are very limited in the existing methods and practically impossible. For example, different predefined animation elements may be merged into the same, already recorded, video stream to adapt one or more of elements of the scenic design and/or stage settings for a different target audience, language, geographical area, and/or the like. Such adjustments and/or replacement of predefined animation elements, offline, through the use of only computer software may significantly reduce costs, time, effort, and/or complexity compared to the exiting methods in which the scene may need to be restored with different scenic design and stage settings and the activity repeated and recorded again.

In addition, since the animation elements, which eventually form most of the scenic design and appearance, is done offline, there is little and possible no need for complex equipment, effects, lighting and/or the typically require significant expertise and/or experience by skilled professionals to operate, create, and/or deploy as done by the existing methods which. The presence of such skilled professionals is therefore not required on-set when recording the live-0action activity thus further reducing costs and increasing accessibility.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
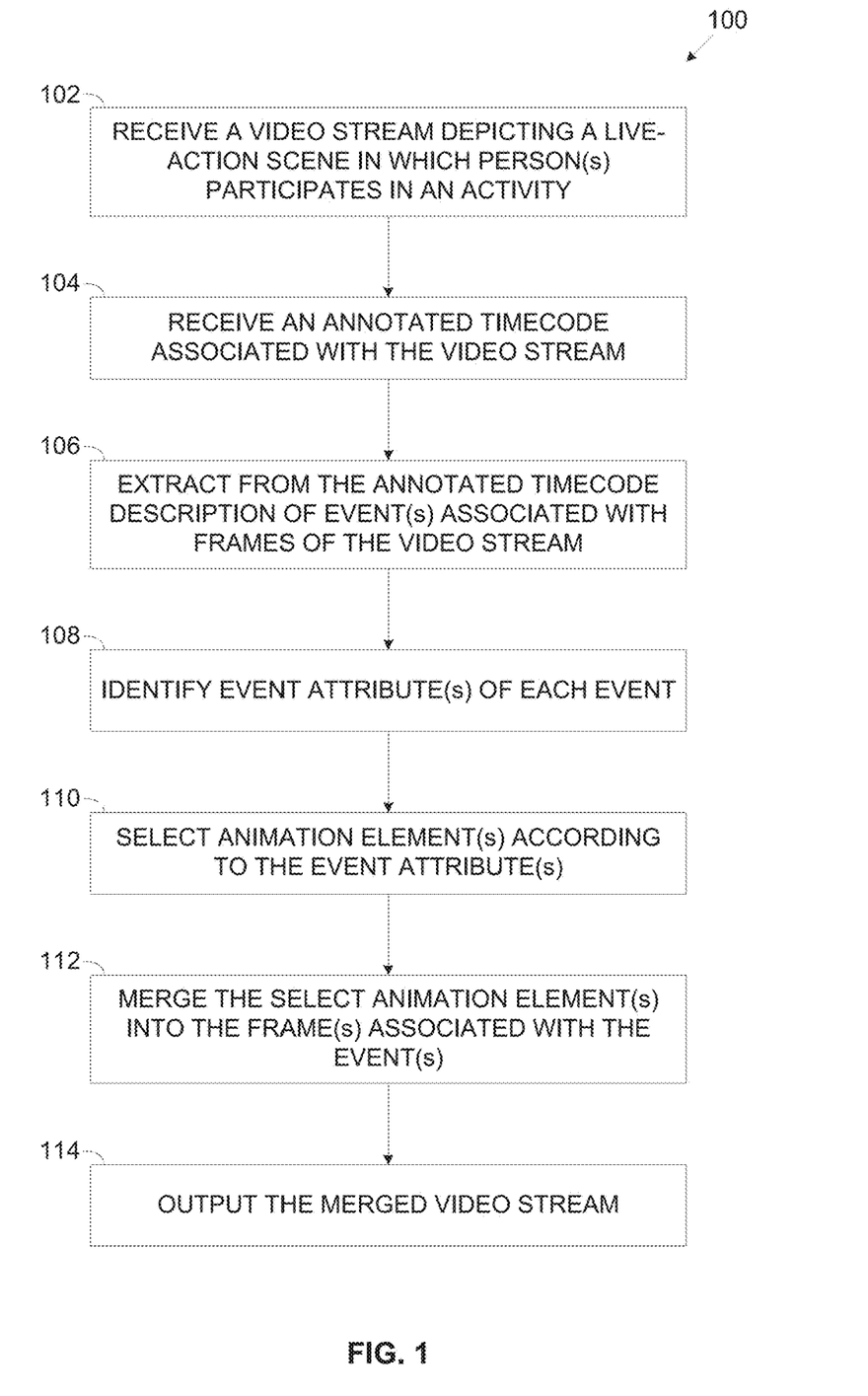
FIG. 1 is a flowchart of an exemplary process of creating a merged video stream combing live-action and animation based on an annotated timecode, according to some embodiments of the present invention.

Referring now to the drawings, FIG. 1 is a flowchart of an exemplary process of creating a merged video stream combing live-action and animation based on an annotated timecode, according to some embodiments of the present invention.

An exemplary process 100 may be executed to create a merged video stream combining video stream depicting one or more live-action scenes with animation elements merged into one or more frames of the video stream.

In particular, the animation elements may be merged with the video stream off-line after the live-action video stream is captured rather than in real-time.

The animation elements, for example, a computer generated element, a picture, a frame, another video stream and/or the like may be added and merged into the live-action scene to create a combined virtual scene in which the animation elements complement, enhance, and/or enrich the live-action scene. For example, the scene may be staged for a TV game show, a reality show, a talent contest, and/or the like. In such case, the scene may comprise only minimal stage and scenic design elements and items, which are mainly used to create a frame and/or infrastructure for later merger with animation elements. After recording one or more video streams depicting the scene and live-action content of persons participating in the game show, one or more animation elements, for example, scenic design elements and/or items, stage settings, background design, lighting elements, accessories, and/or the like may be merged into the video stream(s) thus creating a video stream depicting a virtual scene, i.e., a virtual game show scene which is highly enriched compared to the originally recorded live-action scene.

The animation elements merged in frames of the video stream may be selected according to event attributes of one or more predefined events relating to the persons depicted in the video frames. The events are associated with the corresponding frames in which they are depicted in an annotated timecode associating each event with a timestamp of one or more of the frames depicting the respective event.

The merged video stream combining the video stream depicting live-action scenes with the merged animation elements may be then output and optionally further edited using one or more video editing tools, software suites, and/or the like.

Figure 2A:
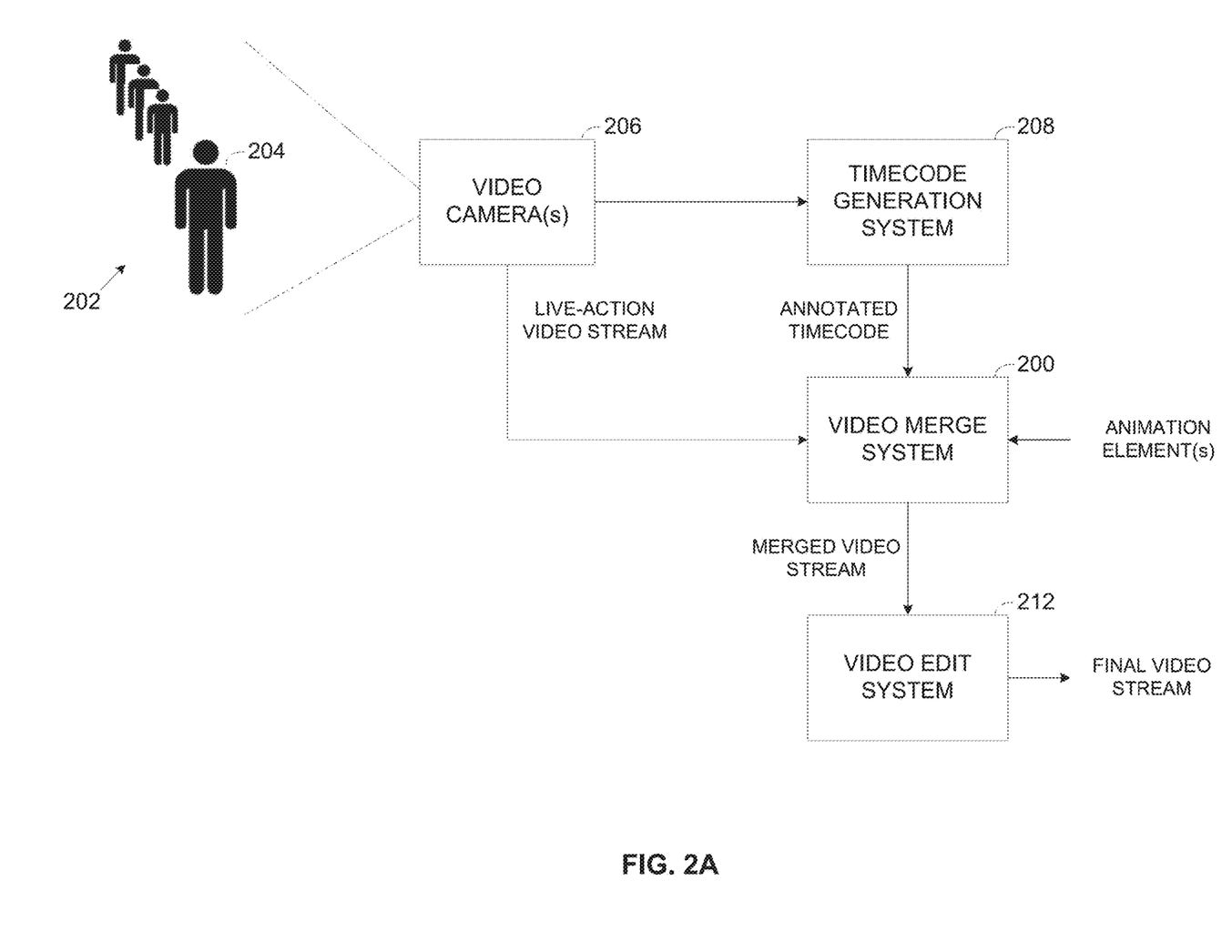
FIG. 2A and FIG. 2B are schematic illustrations of an exemplary system for creating a merged video stream combing live-action and animation based on an annotated timecode, according to some embodiments of the present invention.
Figure 2B:
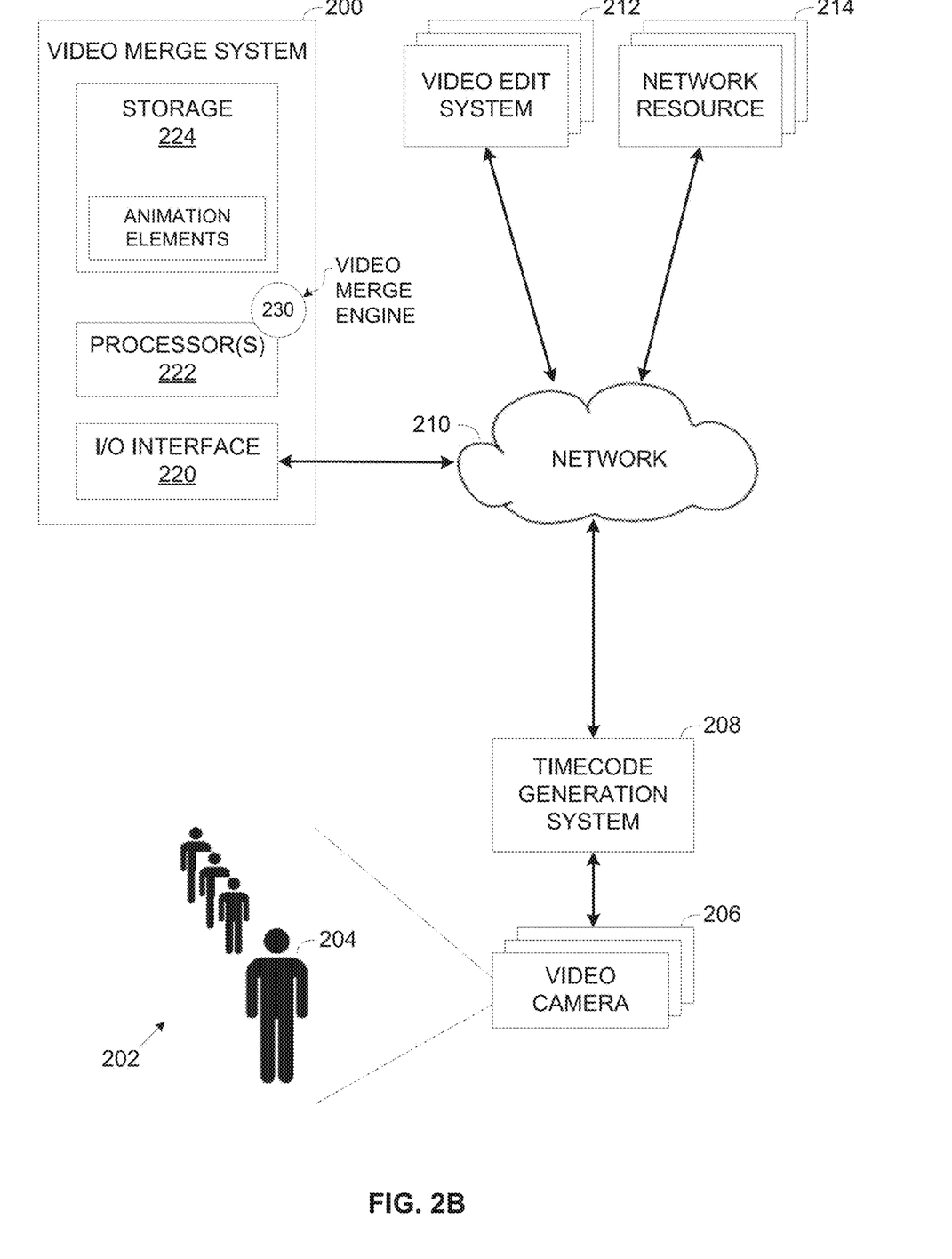

Reference is also made to FIG. 2A and FIG. 2B, which are schematic illustrations of an exemplary system for creating a merged video stream combing live-action and animation based on an annotated timecode, according to some embodiments of the present invention.

As seen in FIG. 2A, an exemplary video merge system 200 may be configured to create one or more merged video streams each combining one or more video streams depicting one or more live-action scenes 202 with merged animation elements.

One or more scenes 202 in which one or more persons 204 participate in one or more activities may be monitored and recorded by one or more video cameras 206 deployed and configured to capture one or more video streams (sequences) comprising a plurality of frames which depicts the live-action scenes.

Each video stream may be associated with a timecode, as known in the art, marking each frame of the video stream with a timestamp, for example, an absolute timestamp expressed with respect to a base clock, a relative timestamp expressing timing and/or order of the frames within the video stream, and/or the like.

The timecode, which may be generated by the video camera(s) 206 and/or by one or more other systems configured to receive the video frames and timestamp them, may be associated with the video frames according to one or more timecode formats, for example, linear timecode, vertical interval timecode, embedded timecode, burnt-in timecode, control track timecode, MIDI timecode, and/or the like.

A time code generation system 208 may be deployed and configured to generate an annotated timecode for each video stream to log events taking place on the scene 202, for example, an action of the person(s) 204, an interaction between persons 204 with one or more other persons 204 on the scene 202, and/or the like taking place (occurring) during the activity on the scene 202 and depicted in the video stream.

The video merge system 200 receiving the annotated timecode may select one or more predefined animation elements according to the events logged in the annotated timecode and may merge the selected animation elements into the video stream captured by the video camera(s) 206 to create a merged video stream combining the live-action which took place on the scene 202 and the merged animation elements.

The video merge system 200 may output the merged video streams for view by one or more viewers. Typically, the merged video stream may be output to one or more video edit systems 212 for further manipulation and/or editing to create a final video delivered for view.

As seen in FIG. 2B, the video merge system 200, for example, a controller, a computer, a server, a computing node, a cluster of computing nodes and/or the like may include an Input/Output (I/O) interface 220, a processor(s) 222, and a storage 224 for storing data and/or computer program code (program store).

Typically, the video merge system 200 may communicate with the other systems, for example, the video camera(s) 206, the timecode generation system 208 and/or the video edit system 212 via a network 210 comprising one or more wired and/or wireless networks, for example, a Local Area Network (LAN), a WLAN (e.g. Wi-Fi), a Wide Area Network (WAN), a Metropolitan Area Network (MAN), a cellular network, the internet and/or the like.

The I/O interface 212 may therefore include one or more wired and/or wireless network interfaces for connecting to the network 210, for example, a LAN adapter, a WLAN adapter, a cellular adapter, and/or the like.

Optionally, the video merge system 200 may further communicate over the network 210 with one or more remote networked resources 214, for example, a server, a storage device, a database, a cloud service, and/or the like.

However, the video merge system 200 may optionally receive data from the timecode generation system 208, the video edit system 212, and/or the remote networked resource(s) 214 via one or more wired and/or wireless I/O interfaces, ports and/or interconnections, for example, a Universal Serial Bus (USB) port, a serial port, a Bluetooth (BT) interface, a Radio Frequency (RF) interface, and/or the like. For example, one or more video streams may be received from the video camera(s) 206 via one or more video specific channels connected between the video merge system 200 and the video camera(s) 206. In another example, one or more video streams and/or one or more annotated timecodes (logs) may be transferred to the video merge system 200 from the video camera(s) 206 and/or the timecode generation system 208 via one or more portable storage media, for example, a memory stick, a video cassette, and/or the like attached and/or inserted into one or more ports, for example, a USB port, and/or a video cassette player available at the I/O interface 220.

Optionally, the video merge system 200 may receive one or more video streams captured by the video camera(s) 206 from the timecode generation system 208 serving as an intermediator between the video camera(s) 206 and the video merge system 200.

The processor(s) 222, homogenous or heterogeneous, may include one or more processing nodes arranged for parallel processing, as clusters and/or as one or more multi core processor(s).

The storage 224 may include one or more non-transitory memory devices, either persistent non-volatile devices, for example, a ROM, a Flash array, a hard drive, an SSD, and/or the like as well as one or more volatile devices, for example, a RAM device, a cache memory and/or the like. The storage 224 may further comprise one or more local and/or remote network storage resources, for example, a storage server, a Network Attached Storage (NAS), a network drive, a cloud storage service and/or the like accessible via the network 210.

A collection of predefined animation elements may be stored locally at the video merge system 200, for example, in the storage 224 and/or remotely in one or more of the remote network resources 214 accessible via the network 210, for example, a storage server, a remote database, a cloud storage, and/or the like and fetched to the local memory of the video merge system 200, for example, the storage 224.

The processor(s) 222 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 224 and executed by one or more processors such as the processor(s) 222.

Optionally, the processor(s) 222 may include, utilize and/or apply one or more hardware elements available in the video merge system 200, for example, a circuit, a component, an Integrated Circuit (IC), an ASIC, an FPGA, a Digital Signals Processor (DSP), a Graphic Processing Unit (GPU), and/or the like.

The processor(s) 222 may therefore execute one or more functional modules utilized by one or more software modules, one or more of the hardware modules and/or a combination thereof. For example, the processor(s) 222 may execute a video merge engine 230 designed and adapted to execute the process 100 for creating a merged video streams combining live-action of persons (or animals) participating in activities captured in video streams with predefined animation elements merged into the video streams.

It should be noted that the steps of the process 100 executed by the video merge system 200, specifically by the video merge engine 230 may be executed by any of one or more processors of the processor(s) 214 such that any processor of the processor(s) 214 may execute the process 100 and/or part thereof or optionally not participate in execution of the process 100.

Optionally, the video merge engine 230, specifically, the video merge engine 230 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

Optionally, the timecode generation system 208 may be integrated with the video merge system 200.

Optionally, the video merge system 200 may be integrated with one or more video edit systems 212.

For brevity, the process 100 is presented and described for creating a single merged video stream by merging one or more predefined animation elements into a single video stream depicting a single live-action scene 202 in which one or more persons 204 participate in a single activity. This, however, should not be construed as limiting since the process 100 may be easily expanded and/or extended for creating multiple merged video stream captured in a plurality of live-action scenes 202 in which a plurality of persons 204 may participate in a plurality of activities.

As described herein before, the process 100 may be typically executed off-line after the live-action activity is recorded at the scene 202.

As shown at 102, the process 100 starts with the video merge engine 230 receiving a video stream comprising a plurality of frames depicting a live-action scene 202 in which one or more persons 204 (or animals) participate in an activity.

As described herein before, the video stream may be associated with a timecode such that each of the plurality of frames is associated (assigned) with a respective timestamp, for example, an absolute timestamp, a relative timestamp, and/or the like.

The activity may comprise a broadcast show produced in a studio, for example, a game show, a music contest, a sports event, a reality show, and/or the like which are recorded and produced for broadcasting and/or distribution via one or more media distribution channels, for example, television, internet, movies, and/or the like. However, the activities may comprise one or more private activities, for example, a game show home production simulating a game show for private use, for example, a family member birthday activity and/or gift, a company event, and/or the like.

A plurality of events may take place (occur) on the scene 202 during the activity, in particular events relating to the person(s) 204 participating in the activity.

The events may include, for example, one or more actions performed by the person(s) 204. For, example, assuming the activity is a game show, the events may comprise, for example, a contestant (person) answering a question, a host (person) asking a question, an answer to a question is presented on a screen, and/or the like. In another example, assuming the activity is a reality show, the events may comprise, for example, one or more person performing a certain mission, task, and/or assignment instructed by a show controller, for example, walk, sing, run, dance, jump, and/or the like.

The events may also include one or more interactions between persons 204 on the scene 202, i.e., between one person 204 and one or more other persons 204 participating in the activity. Such interaction may comprise, for example, talking, dancing, shouting, quarreling, hugging, and/or the like.

As shown at 104, the video merge engine 230 may receive an annotated timecode logging one or more events depicted (seen) in the video stream in association with the frames in which the events are depicted. Specifically, the annotated timecode may associate each logged event with the timestamps of one or more frames of the video stream in which the respective event is depicted (seen, captured).

The events logged in the annotated timecode may be selected from a collection of predefined events, for example, answer question action, ask question action, answer presentation event, walk action, sing action, run action, dance action, jump action, talk interaction, dance interaction, shout interaction, quarrel interaction, and/or the like.

The collection of predefined events may be listed in one or more records, for example, a database, a file, a list, a table, and/or the like accessible to the timecode generation system 208, for example, a local storage of the timecode generation system 208 (e.g. memory, hard drive, etc.), and/or a remote network resource 214 (e.g., server, cloud service, etc.) accessible via the network 210.

The annotated timecode, which may be generated by and/or using the timecode generation system 208, may be implemented using one or more methods, techniques, and/or formats. For example, one or more log records, for example, a file, a list, a table, and/or the like which are separate from the video stream may be created. The separate log record(s) may comprise one or more entries associating the timestamps of one or more of the frames of the video stream with a description of one or more selected predefined events depicted and detected in the respective frames. In another example, the annotated timecode may be embedded in metadata of the video stream. For example, metadata associated with one or more of the frames in the video stream may be adjusted to include the description of one or more of the predefined events depicted and detected in the respective frames.

The description of one or more of the predefined events logged in the annotated timecode may comprise a brief indication of the respective predefined event, for example, a text, an index, a code, and/or the like. For example, the description of the answer question action may comprise "answer", the description of the run action may comprise "run", and so on. In another example, the predefined events may be mapped to numeric index values such that each predefined event corresponds to a certain index value in one or more lists shared by the timecode generation system 208 and the video merge engine 230. In such case, the description of the answer question action may comprise mapped index value, for example, "001" "answer", the description of the run action may comprise its mapped index value, for example, "002", and so on. In another example, the predefined events may be encoded using one or more codes such that each predefined event has a corresponding hard code.

However, one or more of the predefined events logged in the annotated timecode may be described in greater detail. For example, the description of one or more answer question (action) events may further comprise an indication of which (specific) person 204 performed the answer action. In another example, the description of one or more answer question (action) events may further comprise a time it took the person 204 to answer the question, i.e., the time which elapsed between a corresponding question ask action event and the question answer action event performed by the person 204. In another example, the description of one or more dance action events may further comprise a score given by one or more game referees ranking performance of the dance action performed by one or more persons 204.

The annotated timecode, i.e., the description of one or more of the predefined events may be generated manually by one or more users, operators, technicians and/or the like (collectively designated operators) using and/or operating the timecode generation system 208 who are watching the activity and logging the events accordingly in the annotated timecode. For example, when identifying an event, the operator(s) may operate one or more user interfaces, for example a Graphic User Interface (GUI) of one or more software programs executed by the timecode generation system 208 to mark one or more frames of the video stream which depict the event thus associating the timestamp of the marked frames with the event. The annotated timecode may be created manually either in real-time while watching the activity on the scene 202 or its video stream and/or offline while watching the recorded video stream post activity.

However, the annotated timecode and/or part thereof, specifically the events' descriptions may be generated automatically, for example, by the timecode generation system 208. The description of each predefined event may be typically also predefined, for example, a unique indicator may be assigned to each of one or more of the predefined events, a respective text (template) may be defined for each of one or more of the predefined events, and/or the like. The timecode generation system 208 may therefore select the appropriate description for each event that took place on the live-action scene 202 and depicted in the video stream.

The timecode generation system 208 may apply one or more methods to detect the events that occurred on the scene 202 and are depicted in the video stream. For example, the timecode generation system 208 may generate description for one or more predefined events based on data received from one or more systems, devices, platforms, and/or the like used by the person(s) 204 participating in the activity taking place in the scene 202. For example, assuming the activity is a game show participated by four persons 204 (contestants) where each person 204 uses a respective user interface, e.g., console, panel, scree, buzzer, and/or the like to perform one or more actions, for example, answer question (action). In such case, the timecode generation system 208 may monitor the user interface and/or communicate with a system controlling the user interface used by the persons 204 to detect a signal received from the user interfaces to identify the answer question action event performed by one or more of the persons 204. The timecode generation system 208 may further correlate the received signal with the video stream to identify one or more frames which depict the answer question action event and associate the event with theses frames. The timecode generation system 208 may generate an event accordingly, specifically select the event from a collection of pre-defined events and update the annotated timecode (log) accordingly.

In another example, the timecode generation system 208 may generate description for one or more predefined events based on analysis of one or more frames of the video stream, for example, a content analysis, a context analysis, a combination thereof, and/or the like.

For example, the timecode generation system 208 may apply one or more visual and/or audio analysis algorithms, techniques, and/or tools, for example, computer vision, image processing, speech recognition, Natural Language Processing (NLP), machine learning classification, and/or the like to analyze the video stream and identify one or more of the predefined events depicted in one or more frames of the video stream. For example, based on visual analysis of frames of the video stream, the timecode generation system 208 may detect one or more actions (events), for example, jump, walk, run, and/or the like performed by one or more of the persons 204 participating in the activity. In another example, based on speech analysis of a soundtrack of the video stream, the timecode generation system 208 may detect one or more actions, for example, talk, sing, shout, and/or the like performed by one or more of the persons 204 participating in the activity.

In another example, the timecode generation system 208 may apply one or more context analyses to identify one or more of the predefined events depicted in the video stream. For example, based on visual analysis of frames of the video stream, the timecode generation system 208 may detect one or more text elements displayed on one or more screens on the live-action scene 202 which may be indicative of corresponding events, for example, a "correct answer" message may be indicative of a correct answer event in response to a question answer operation performed by one or more persons 204 on the scene 202, a "win" title may be indicative of a win of one or more of the persons 204 in a game show, and/or the like.

The timecode generation system 208 may then generate and/or select a description for the events identified based on one or more of video stream analyses. The timecode generation system 208 may further correlate the identified events with the frames in which they are detected and associate the events, specifically the descriptions of the events with the timestamps of the correlated frames which depict the events. The timecode generation system 208 may then update the annotated timecode accordingly to log these events with association to the frames of the video stream.

As shown at 106, the video merge engine 230 may extract the events logged in the annotated timecode, specifically the description of the logged events. In particular, the video merge engine 230 may identify the logged events in association with frames of the video stream which depict these events.

As shown at 108, the video merge engine 230 may identify one or more event attributes of each logged event based on the description of the respective event.

The event attributes of one or more of the logged events may be embedded and/or included in the description of the respective events such that the video merge engine 230 may extract the event attributes from the description logged in the annotated timecode. In another example, the event attributes of one or more of the predefined events may be derived from the description logged in the annotated timecode. For example, one or more event attributes may be also predefined for one or more of the predefined events. For example, a certain predefined event, for example, answer question action event may be associated with one or more first event attributes when performed during a first activity (e.g., first type of game show) and thus associated with a first event identifier while associated with one or more second event attributes when performed during a second activity (e.g., second type of game show) and thus associated with a second event identifier. In such case, the video merge engine 230 may identify the event attributes of the certain event by accessing one or more records (e.g. database, list, file, etc.), stored locally at the video merge system 200 and/or remotely in one or more remote network resources 214, which associate events identifiers with respective event attributes.

The event attributes of one or more of the logged events may comprise attributes relating to the activity, for example, a genre of the activity, for example, a game show, a reality show, a studio production, a home production, etc., a geographical location of the scene 202, a language used during the activity, and/or the like. In another example, the event attributes may indicate a type of the event, for example, a type of action (event) performed by one or more of the persons 204 on the scene 202, a type of interaction (event) between two or more of the persons 204 on the scene 202, and/or the like. In another example, the event attributes of one or more of the events may comprise an indication of the number of person(s) 204 involved in the respective event. In another example, the event attributes of one or more of the events may comprise an indictor and/or identifier of the person(s) 204 involved in the respective event.

In another example, the event attributes of one or more of the events may comprise one or more spatial parameters relating to location, position, orientation, posture and/or the like of the person(s) 204 in the scene 202. For example, the event attributes of a one or more events may indicate a posture, position, and/or orientation of one or more of the person(s) 204 during the respective event, for example, standing, sitting, crouching, and/or the like. In another example, the event attributes of one or more events may indicate a location in the scene 202 of one or more of the person(s) 204 during the respective event, for example, a segment in the frame(s), coordinates of pixels in the frame(s), and/or the like.

In another example, the event attributes of one or more of the events may comprise one or more parameters and/or characteristics relating to the respective event. For example, the event attributes of a certain answer question action event may comprise a true or false outcome of the question answer action. In another example, the event attributes of a certain answer question action event may further comprise knowledge domain of the question (e.g., nature life, geography, sports, arts, culture, celebrities, politics, etc.).

As shown at 110, the video merge engine 230 may select one or more predefined animation elements according to one or more of the event attributes of one or more of the events logged in the annotated timecode.

In particular, the video merge engine 230 may select one or more predefined animation elements from a collection comprising a plurality of predefined animation elements, which, as described herein before, may be stored locally at the video merge system 200 and/or remotely in one or more of the network resources 214.

The predefined animation elements are designated animation elements to indicate that the they are distinct and not part of the live-action scene 202 such that predefined animation elements do not exist on the scene 202 and are thus invisible, and/or undetectable in the video stream depicting the live-action scene 202.

The predefined animation elements may include, for example, computer generated elements, images, video clips, pictures, and/or the like. The predefined animation elements may comprise animated elements, i.e., computer generated visual elements. However, the predefined animation elements may not necessarily comprise animated content but rather real-world content captured elsewhere of the live-action scene 202, for example, live-action, scenery, objects, people, and/or the like which may be optionally fused and/or merged with animated dements. However, regardless of whether they comprise real-world and/or animated content, the predefined animation elements do not exist in the live-action scene 202.

The predefined animation elements may be designed, created, generated, adapted, configured, and/or adjusted to cover, fit, enhance, complement and/or merge with one or more scene elements deployed and/or present in the live-action scene 202, for example, a stage setting element, a chair, a podium, a wall, a floor, a ceiling, a screen, a display, and/or the like. In particular, the predefined animation elements may simulate one or more stage settings and/or design elements and/or items, background design, lighting elements, accessories, and/or the like designed and/or configured to virtually enrich the live-action scene 202 when merged into the video stream.

For example, one or more predefined animation elements, for example, a computer generated element, a picture and/or the like may be adapted to cover a background wall of the scene 202. In another example, one or more predefined animation elements, for example, a computer generated element, an image, a video clip, a picture, and/or the like may be adapted to cover a screen deployed in the scene 202. In another example, one or more predefined animation elements, for example, a computer generated element, an image, and/or the like may be adapted to form a podium for one or more of the persons 204 in the scene 202. In another example, one or more predefined animation elements, for example, a computer generated element, a picture, and/or the like may be adapted to form an animated structure for one or more of the persons 204 in the scene 202.

One or more methods may be applied for selecting the predefined animation elements according to the event attributes identified for the events logged in the annotated timecode.

For example, a set of predefined animation elements may be selected from the collection of predefined animation elements based on one or more event attributes identified in the annotated timecode, for example, a type, a genre, a geographical location, a language, and/or the like of the activity and/or the scene 202. The set of predefined animation elements may be selected manually by one or more game directors, designers, managers, and/or the like collectively designated director and/or automatically by the video merge engine 230.

For example, assuming that the event attributes of one or more events logged in the annotated timecode associated with the video stream indicate that the activity is a quiz game show produced and filmed in Spanish. In such case, based on these event attributes a first set of predefined animation elements may be selected. The first set may comprise one or more predefined animation elements which are designed for quiz game shows, for example, a host podium ornament, one or more contestant posts, a questions/answers screen, a score board, and/or the like. The first set may further comprise one or more predefined animation elements adapted for Spanish speaking audience, for example, the questions/answers presented on the screen in Spanish. In another example, assuming that the event attributes of one or more events logged in the annotated timecode associated with the video stream indicate that the activity is a talent show produced and filmed in English in the UK, based on these event attributes a second set of predefined animation elements may be selected. The second set may comprise one or more predefined animation elements which are designed for talent competition shows, for example, a stage, one or more referee posts, a background decoration, a score board, and/or the like. The second set may further comprise one or more predefined animation elements adapted for the English and/or for the UK, for example, English speaking signs, predefined animation elements expressing objects typical to UK, for example, Queen's Guard soldiers, and/or the like.

After the set of predefined animation elements is selected and defined for the activity depicted in the video stream, the video merge engine 230 may further process the video stream and its associated annotated timecode and select one or more of the predefined animation elements of the set based on event attributes of one or more of the events logged in the annotate timecode.

In another example, the video merge engine 230 may select the predefined animation elements according to one or more templates and/or rules defined for one or more of the plurality of predefined events of a plurality of activities. For one or more of the events logged in the annotated timecode the video merge engine 230 may therefore traverse the template and/or the rules to identify and select one or more predefined animation elements of the collection that is dictated and/or defined for the value of the event attribute(s) of the respective event.

As shown at 112, the video merge engine 230 may create a merged video stream by merging the selected predefined animation elements into the video stream depicting the activity which occurred at the live-action scene 202.

In particular, the video merge engine 230 may merge each selected predefined animation element into the frames (of the video stream) which depict the event. To this end, the video merge engine 230 may correlate between the event and the frame(s) which depict it based on the timestamp of the frame(s) which are logged for each frame in the timecode associated with the video stream and for each event in the annotated timecode.

The video merge engine 230 may merge the selected predefined animation elements into the video stream by rendering each selected predefined animation element with one or more of its corresponding frames, i.e., frames depicting the event, which are identified according to their timestamps. One or more of the predefined animation elements may be pre-rendered, meaning that such animation elements are rendered in advanced. In such case, the video merge engine 230 may merge may merge these animation elements into the video stream as is with no further processing. However, one or more of the animation elements which are not pre-rendered and available for example, as computer program instructions (code), may be rendered together with the video stream and merged into the video stream.

Optionally, the video merge engine 230 may generate and/or render one or more of the selected animation elements merged into the video stream at a different speed compared to the live-action content depicted in the video stream. For example, the video merge engine 230 may generate one or more of the predefined animation elements to create a slow motion effect of the animation elements compared to the live-content. In another example, the video merge engine 230 may generate one or more of the predefined animation elements to create a fast motion effect of the animation elements compared to the live-content.

The video merge engine 230 may merge and render one or more of the selected predefined animation elements with one or more of their corresponding frames based on alignment with one or more real-world reference elements placed, marked, and/or otherwise deployed in the scene 202 and depicted in the corresponding frames.

The reference elements may be based on one or more of the scene elements present in the scene 202, for example, a wall, a stage, a chair, a post, a podium, and/or the like. For example, assuming the video merge engine 230 selected a certain predefined animation element, for example, a display of animated content on a screen deployed in the scene 202, the video merge engine 230 may align the animated content in one or more frames of the video stream according to an outline of the screen. In another example, assuming the video merge engine 230 selected a certain predefined animation element, for example, an animated vehicle for sitting a person 204 sitting in the scene 202 on a chair, the video merge engine 230 may align the animated vehicle in one or more frames of the video stream according to one or more legs of the chair.

However, one or more of the reference elements may be based on one or more elements specifically placed, marked, and/or otherwise deployed in the scene 202, for example, fiducials located at predefined and known locations of the scene 202 according to one or more coordinate systems. For example, three fiducials may be marked on one or more walls at the scene 202. A relative location of each on scene element may be known to the video merge engine 230, such that the video merge engine 230 may compute its location accordingly and merge the predefined animation element(s) selected according to one or more logged events into one or more frames according to the computed location of one or more scene elements.

Optionally, the video merge engine 230 may adjust one or more of the predefined animation elements merged into one or more corresponding frames to fit one or more (on) scene elements deployed in the scene 202 and depicted in the frames.

For example, the video merge engine 230 may adjust scale, proportion, dimension, and/or the like of one or more of the predefined animation elements merged into one or more corresponding frames according to one or more attributes and or parameters of one or more scene elements deployed in the scene 202, in particular, such scene elements which the predefined animation elements have to fit.

For example, the video merge engine 230 may adjust the proportion and/or dimension of a predefined animation element merged into one or more corresponding frames according to dimensions of one or more scene elements that may be affected by a distance of these scene elements from the video camera 206 capturing the video stream. Moreover, the video camera 206 may dynamically change its location, position, and/or orientation during the activity such that the distance of the video camera 206 to one or more of the scene elements may dynamically change through the video stream and their dimensions may thus change. In such case, the video merge engine 230 may change proportion and/or one or more dimensions of the predefined animation element in order to fit it, for example, cover one or more of the scene elements having dynamically changing dimensions.

In another example, the video merge engine 230 may adjust one or more of the merged predefined animation elements, for example, stretch one side and shorten another according to an orientation of one or more scene elements which may be affected by its angle to the video camera 206 capturing he video stream. Moreover, since the video camera 206 may dynamically change its location, position, and/or orientation during the activity, the view angle of video camera 206 to one or more of the scene elements may dynamically change. In such case, the video merge engine 230 may dynamically adjust one or more of the merged predefined animation elements to fit, for example, cover one or more of the scene elements which dynamically change their orientation in the video stream.

Optionally, the video merge engine 230 may adjust the video stream to remove One or more real-world features, elements, and/or items from one or more frames of the video stream. As such, in addition and/or in parallel to merging one or more predefined animation elements into one or more frames of the video stream, the video merge engine 230 may further remove, conceal, and/or discard one or more real-world features which are present in the live-action scene 202 and are thus depicted in one or more frames of the video stream. For example, the video merge engine 230 may adjust one or more of the frames to remove one or more structural elements depicted in the frames, for example, a wall, a scaffold, a frame, and/or the like which were present in the scene 202 and thus seen in the video stream. In another example, the video merge engine 230 may adjust one or more of the frames to remove one or more studio equipment items depicted in the frames, for example, camera, microphone, recording gear, control panel, and/or the like which were present in the scene 202 and thus captured in the video stream.

Optionally, the video stream depicting the activity which took place at the scene 202 comprises a composite video stream constructed of a plurality of separate video streams captured by a plurality of video cameras such as the video camera 206 depicting the scene from a plurality of view angles (view points).

Moreover, in case of a composite video stream, the video merge engine 230 may adjust one or more of the selected predefined animation elements according to the view angle selected from the plurality of view angles. For example, in case of switching between two or more video streams depicting the scene 202 from multiple view angles (points), the dimensions, orientation, and/or position of one or more scene elements may change, the video merge engine 230 may adjust accordingly the scale, proportion and/or dimensions of one or more of the selected predefined animation elements, specifically according to the attributes of such scene elements which the selected predefined animation elements need to fit.

Optionally, the video merge engine 230 may select one or more pre-recorded audio effects according to one or more event attributes of one or more of the events logged in the annotated timecode and merge automatically the selected pre-recorded audio effect(s) into the merged video stream in association with one or more frames depicting the logged event(s).

The video merge engine 230 may select the pre-recorded audio effects from a collection comprising a plurality of audio effects pre-recorded for a plurality of events, for example, actions and/or interactions typical to one or more persons 204 participating in one or more activities. For example, assuming that based on one or more event attributes of a certain event, for example, a question answer action of a person 204 participating in a certain activity, for example, a quiz game show, the video merge engine 230 determines the answer of the person 204 is correct. In such case, the video merge engine 230 may select a win sound effect, for example, a cheerful bell sound and merge the win sound effect into the video stream, in particular in association with the correct answer action event. In contrast, assuming that based on the event attribute(s) of the certain event, for example, the question answer action, the video merge engine 230 determines the answer of the person 204 is wrong, the video merge engine 230 may select a fail sound effect, for example, a down-tone horn sound and merge the fail sound effect in association with the correct answer action event.

Figure 3A:
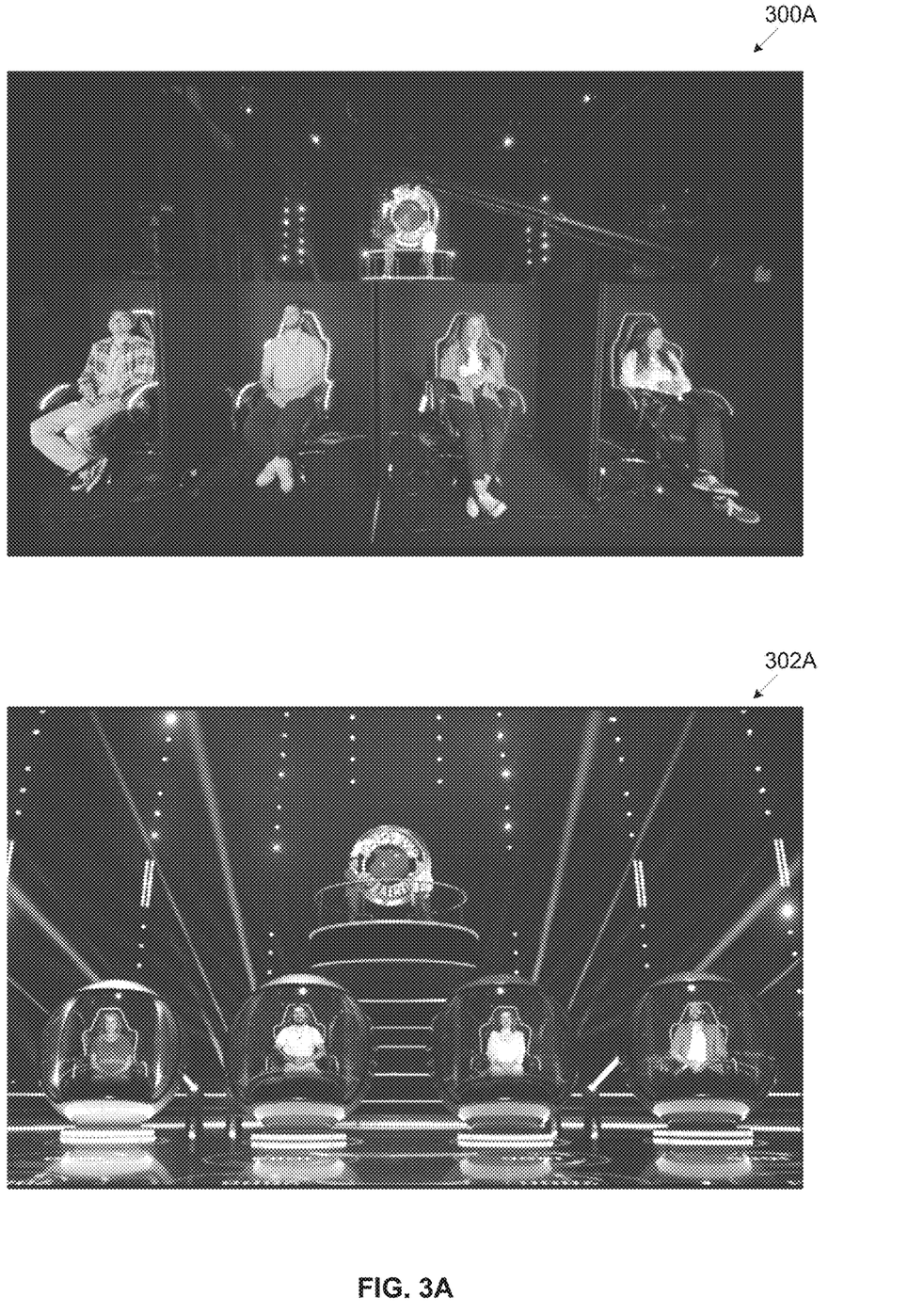
FIG. 3A and FIG. 3B are frames extracted from exemplary video streams depicting live-action scenes and corresponding images extracted from merged video streams created by merging animation elements into the video streams, according to some embodiments of the present invention.
Figure 3B:
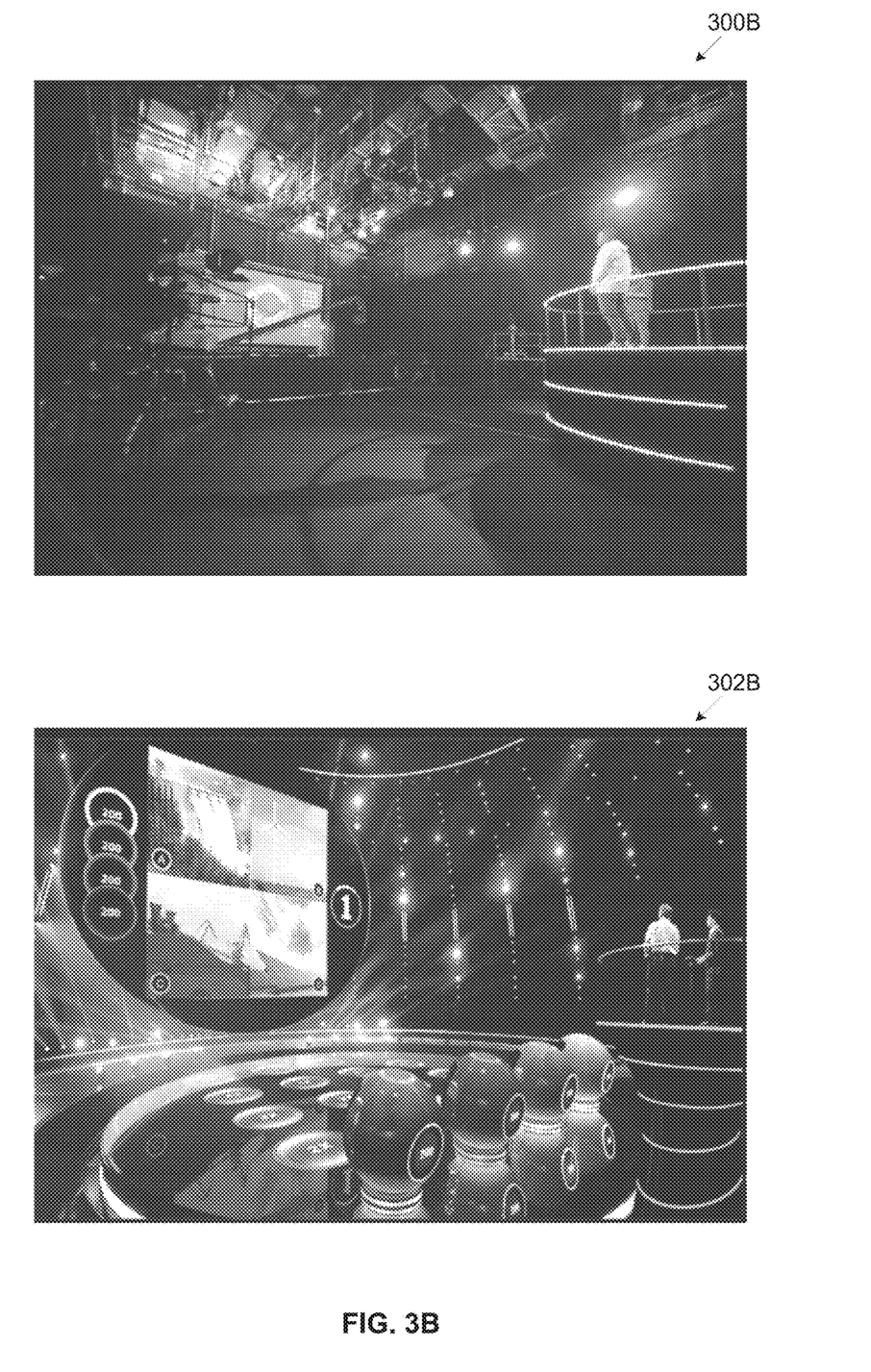

Reference is now made to FIG. 3A and FIG. 3B, which are frames extracted from exemplary video streams depicting live-action scenes and corresponding images extracted from merged video streams created by merging animation elements into the video streams, according to some embodiments of the present invention.

As seen in FIG. 3A, a frame 300A extracted from an exemplary video stream depicts a live-action scene such as the scene 202 in which four referees such as the person 204, sitting with their back to a stage, judge a contestant such as the person 204 competing in a TV game show who stands on the stage with a host of the show such as the person 204. As seen, the live-action scene depicted in frame 300A comprises minimal settings and elements wherein the contestants sit in chairs, the stage is formed by basic frame constructed of scaffolds, and there are no background settings.

A frame 302A which corresponds to the frame 300A is extracted from a merged video stream in which predefined animation elements are merged into the original video stream. For example, animation elements simulating personal capsules were merged into the frame such that it appears as if the referees are sitting in the capsules. In another example, animation elements simulating lighting elements and ornaments are merged into the frame to enhance appearance of the stage. In another example, animation elements simulating lighting elements are merged into the frame to create a vertical light dots effect in the background of the scene.

As evident, the virtual scene portrayed in frame 302A is significantly enriched, enhanced and more appealing and/or grandiose compared to the original live-action scene portrayed in frame 300A.

As seen in FIG. 3B, a frame 300B extracted from an exemplary video stream depicts a live-action scene 202 in which two contestants such as the person 204 stand on a stage in front of a large screen. As seen, the live-action scene depicted in frame 300A comprises minimal settings and elements wherein the screen is facilitated by a basic display, the stage is constructed of a minimal structure, and there are no background settings.

A frame 302B which corresponds to the frame 302A is extracted from a merged video stream in which predefined animation elements are merged in the original video stream. For example, a predefined animation element simulating an enhance huge display is merged into the frame 302B at the location of the screen in front of the stage. In another example, animation elements simulating a game board with selectable items are added to the frame 302B between the stage and the screen. In another example, animation elements simulating lighting elements are merged into the frame to create a vertical light dots effect in the background of the scene.

As evident, the virtual scene portrayed in frame 302B is significantly enriched, enhanced and more appealing and/or grandiose compared to the original live-action scene portrayed in frame 302A.

Reference is made once again to FIG. 1.

As shown at 114, the video merge engine 230 may output the merged video stream combining the live-action content depicted in the video stream captured at the scene 202 and the predefined animation elements merged into the video stream.

In particular, the video merge engine 230 may save (store) the merged video stream in one or more digital records in which the selected predefined animation elements are rendered together with the corresponding frames of the video stream. This means that the saved video stream may comprise each predefined animation element selected for one or more of the events logged in the annotated timecode rendered with each of one or more corresponding frames which depict the respective event. Moreover, the merged video stream saved in the digital record(s) may optionally comprise one or more selected pre-recorded audio effects merged into the video stream in association with one or more of the logged events.

In particular, the video merge engine 230 may save the merged video stream in one or more editable digital records according to one or more video editing software formats such that the editable digital record(s) may be edited and/or manipulated using one or more video editing tools, suites, programs, and/or the like, collectively designated video editing tools, for example, Adobe Premier Pro, DaVinci Resolve, Frim Cut Pro, Blender, Kdenlive, and/or the like.

The video merge engine 230 may apply one or more methodologies for creating the editable digital record(s) expressing the merged video stream. For example, the video merge engine 230 may save the merged video stream in the editable digital record(s) in one or more video formats such that the merged video stream may be extracted by the video editing tools which may optionally further edit and/or manipulate the merged video stream.

In another example, the video merge engine 230 may generate one or more descriptive editable digital records which describe the edits and mergers of the predefined animation elements in the video stream rather than comprising the actual merged video stream. The video merge engine 230 may generate the descriptive editable digital records according to one or more formats, protocols, standards, and/or conventions, for example, Extensible Markup Language (XML), Edit Decision Lists (EDL), ad/or the like supported by one or more of the video editing tools. One or more video editing tools having access to the original video stream depicting the activity which took place at the live-action scene 202 and to the collection of predefined animation elements may therefore use the descriptive editable digital record(s) to create the merged video stream accordingly and optionally further edit and/or manipulate it.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms video camera, timecode format are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of generating a live-action scene video stream with enriched scenery settings and background by creating automatically a merged video stream combining live-action and animation, comprising:

using at least one processor for:
receiving a video stream comprising a plurality of frames depicting a live-action scene pre-recorded in a scenery having a first scenery settings and background, in which at least one person participates in an activity, the video stream captured by at least one video camera is associated with an annotated timecode associating a timestamp of at least one of the plurality of frames depicting at least one of a plurality of predefined events relating to the activity with a description of the at least one predefined event;
selecting automatically at least one of a plurality of predefined animation elements according to at least one event attribute of the at least one predefined event, wherein said at least one of a plurality of predefined animation elements comprises a second scenery settings and background;

creating a merged video stream by merging the selected at least one predefined animation element into the at least one frame identified by its timestamp, wherein in said created merged video stream, said first scenery settings and background is replaced by said second scenery settings and background and wherein said second scenery settings and background are adjusted to fit said first scenery settings and background using one or more scene elements deployed in the scene and depicted in the at least one frame; and outputting an editable digital record of the merged video stream.

2. The method of claim 1, wherein merging the at least one predefined animation element into the at least one frame comprises rendering the at least one predefined animation element with the at least one frame and saving the merged at least one frame in the editable digital record.

3. The method of claim 1, wherein the at least one predefined animation element is pre-rendered.

4. The method of claim 1, wherein the at least one predefined animation element merged into the video stream is generated at a different speed than live-action content depicted in the video stream.

5. The method of claim 1, wherein the at least one predefined animation element is merged into the at least one frame based on alignment with at least one real-world reference element deployed in the scene and depicted in the at least one frame.

6. The method of claim 1, further comprising adjusting the video stream to remove at least one real-world feature from at least one frame of the video stream.

7. The method of claim 1, further comprising the video stream comprises a composite video stream constructed of a plurality of separate video streams captured by a plurality of video cameras depicting the scene from a plurality of view angles.

8. The method of claim 1, wherein the digital record of the merged video stream is created according to at least one video editing software format.

9. The method of claim 1, wherein the at least one event comprises at least one action performed by the at least one person.

10. The method of claim 1, wherein the at least one event comprises at least one interaction of the at least one person with at least one another person.

11. The method of claim 1, wherein the at least one animation element is a member of a group consisting of: a computer generated element, an image, a video clip, and a picture.

12. The method of claim 1, further comprising selecting at least one pre-recorded audio effect according to the at least one event attribute and merging automatically the at least one pre-recorded audio effect into the video stream in association with the at least one frame.

13. The method of claim 1, wherein the annotated timecode is included in at least one separate record associating the description with the timestamp of the at least one frame.

14. The method of claim 1, wherein the annotated timecode is included in metadata associated with the video stream.

15. The method of claim 1, wherein the description of the at least one predefined event is generated automatically based on content and/or context analysis of the at least one frame.

16. The method of claim 1, wherein the activity comprises a show produced in a studio.

17. The method of claim 1, wherein the activity comprises a private show.

18. The method of claim 1, further comprising creating a second merged video stream by merging into the at least one frame identified by its timestamp, selected at least one predefined animation element comprising a third scenery settings and background, such that said first scenery settings and background are replaced in said second merged video, by said third scenery settings and background.

19. A system for generating a live-action scene video stream with enriched scenery settings and background by creating automatically a merged video stream combining live-action and animation, comprising:

at least one processor executing a code, the code comprising:

code instructions to receive a video stream comprising a plurality of frames depicting a live-action scene pre-recorded in a scenery having first scenery settings and background, in which at least one person participates in an activity, the video stream captured by at least one video camera is associated with an annotated timecode associating a timestamp of at least one of the plurality of frames depicting at least one of a plurality of predefined events relating to the activity with a description of the at least one predefined event;

code instructions to select automatically at least one of a plurality of predefined animation elements according to at least one event attribute of the at least one predefined event, wherein said at least one of a plurality of predefined animation elements comprises second scenery settings and background;

code instructions to create a merged video stream by merging the selected at least one predefined animation element into the at least one frame identified by its timestamp, wherein in said created merged video stream, said first scenery settings and background are replaced by said second scenery settings and background and wherein said second scenery settings and background are adjusted to fit said first scenery settings and background using one or more scene elements deployed in the scene and depicted in the at least one frame; and code instructions to output an editable digital record of the merged video stream.

20. A computer program product for generating a live-action scene video stream with enriched scenery settings and background by creating automatically a merged video stream combining live-action and animation, comprising a non-transitory medium storing thereon computer program instructions which, when executed by at least one hardware processor, cause the at least one hardware processor to:

receive a video stream comprising a plurality of frames depicting a live-action scene pre-recorded in a scenery having first scenery settings and background, in which at least one person participates in an activity, the video stream captured by at least one video camera is associated with an annotated timecode associating a timestamp of at least one of the plurality of frames depicting at least one of a plurality of predefined events relating to the activity with a description of the at least one predefined event;

select automatically at least one of a plurality of predefined animation elements according to at least one event attribute of the at least one predefined event, wherein said at least one of a plurality of predefined animation elements comprises second scenery settings and background;

create a merged video stream by merging the selected at least one predefined animation element into the at least one frame identified by its timestamp, wherein in said created merged video stream, said first scenery settings and background are replaced by said second scenery settings and background and wherein said second scenery settings and background are adjusted to fit said first scenery settings and background using one or more scene elements deployed in the scene and depicted in the at least one frame; and output an editable digital record of the merged video stream.

* * * * *